United States Patent [19]
Quintel

[11] Patent Number: 5,307,582
[45] Date of Patent: May 3, 1994

[54] ADJUSTABLE BAND

[76] Inventor: James A. Quintel, 1635 N. Irwin, Hanford, Calif. 93230

[21] Appl. No.: 999,744

[22] Filed: Dec. 31, 1992

[51] Int. Cl.[5] ............................................. A44B 11/00
[52] U.S. Cl. ........................................ 40/633; 24/303; 224/183; 224/267; 335/303
[58] Field of Search ................... 40/633; 224/183, 219, 224/221, 222, 267; 335/303, 385; 24/303, 680; 63/3, 5.1

[56] References Cited
U.S. PATENT DOCUMENTS

| | | | |
|---|---|---|---|
| 397,833 | 2/1889 | Colby | 224/221 |
| 421,615 | 2/1890 | Riker | 224/221 |
| 429,039 | 5/1890 | Kienle | 224/221 |
| 2,389,298 | 11/1945 | Ellis | 335/303 |
| 3,254,859 | 6/1966 | Reisch | 335/303 X |
| 3,407,507 | 10/1968 | Brubaker | 335/303 X |
| 3,885,383 | 5/1975 | Tanaka | 224/183 X |

*Primary Examiner*—Kenneth J. Dorner
*Assistant Examiner*—Cassandra Davis
*Attorney, Agent, or Firm*—Timothy T. Tyson

[57] ABSTRACT

An adjustable band (10) is provided which utilizes magnetic force to retain the desired circumference. The band is fabricated from a planer strip of flexible magnetized material (12), and allows a continuous range of circumferential adjustment. Magnetized or magnetic guides (22, 24) hold the ends (18, 20) of the adjustable band (10) together.

2 Claims, 2 Drawing Sheets

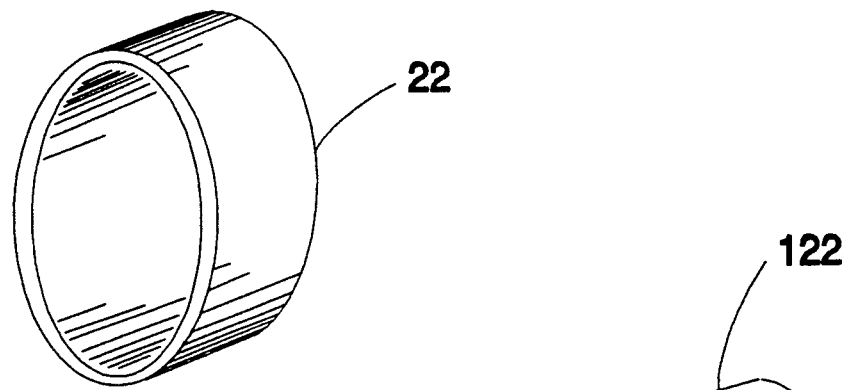
FIG. 5
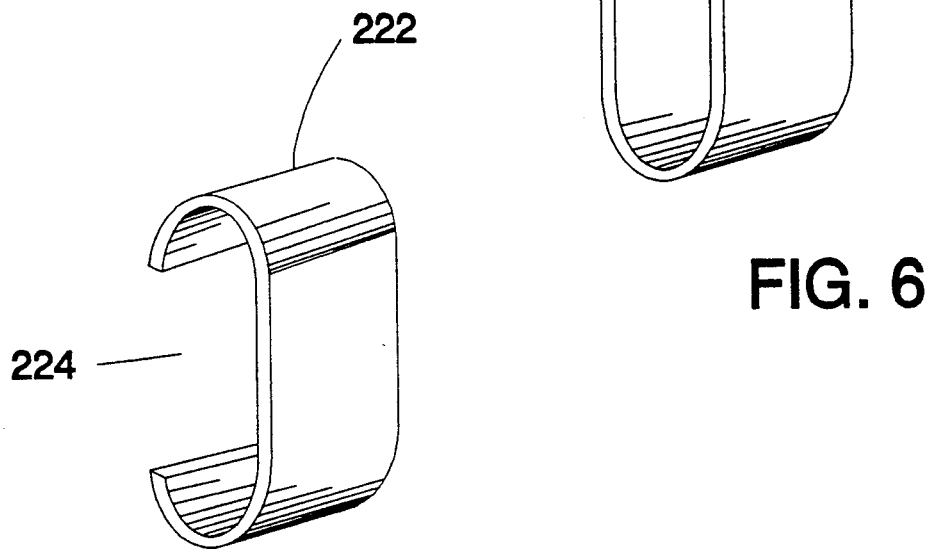
FIG. 6
FIG. 7
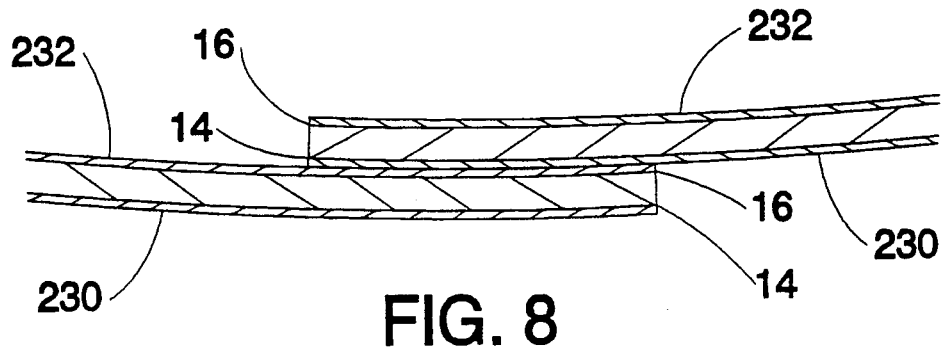
FIG. 8

ADJUSTABLE BAND

TECHNICAL FIELD

The present invention pertains to adjustable bands, and more particularly to adjustable bands fabricated from magnetized material which retain their adjustment through magnetic force.

Adjustable bands have been known in the art for many years. Typical in the art are adjustable wristbands for watches and bracelets, adjustable collars, anklets and the like. These devices employ various mechanical means to achieve the desired band circumference. For example, U.S. Pat. 2,508,147 describes a double acting slide fastener which utilizes a zipper like mechanism to adjust the circumference of a watchband. This device has the disadvantages of being mechanically complex and therefore prone to failure. It is also costly to manufacture. U.S. Pat. 3,361,311 shows a wristband having guide fingers, pins and eyelets, and punchmarks to make circumference adjustments in discrete steps only.

DISCLOSURE OF INVENTION

The present invention is directed to an adjustable band fabricated of a planer strip of flexible magnetized material. The strip has first and second sides and first and second ends. The strip is folded onto itself to form a ring shape where the first side of the strip is placed in contact with and overlaps the second side of the strip. Where the two sides are in contact, they are attracted to each other through the magnetic force of the magnetized material. The magnetic force retains the two contacting sides in a relative fixed position. A first guide means is coupled to the first end of the strip and the second end passes through it and slidably holds the second end. The first guide means surrounds both the first and second ends of the strip and holds the first and second sides of the strip in planer contact so that the attracting magnetic force between the sides is maintained. A second guide means is coupled to the second end and the first end passes through it and slidably holds the first end. The second guide means also surrounds both the first and second ends of the strip and holds the first and second sides of the strip in planer contact so that the attracting magnetic force between the sides is maintained. The circumference of the band is adjusted by manually overcoming the magnetic force holding the sides together, and moving one side circumferentially with respect to the other. The two guide means additionally serve as mechanical stops which prevent the two ends of the band from disengaging.

In accordance with an important aspect of the invention, the first and second guide means are fabricated of a flexible material. In a preferred embodiment, the guide means are fabricated from a flexible magnetized material similar to the material used to fabricate the strip.

In accordance with a preferred embodiment of the invention, the first and second sides are suitable for the disposition of indicia. Alternately, non-magnetic flexible material is laminated or glued to one or both sides for decorative purposes or to provide better surfaces for displaying the indicia.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 5 is an enlarged perspective view of a guide means;

FIG. 6 is an enlarged perspective view of a second type of guide means;

FIG 7 is an enlarged perspective view of a third type of guide means and,

FIG. 8 is an enlarged edge view of a portion of an adjustable band similar to FIG. 2.

MODES FOR CARRYING OUT THE INVENTION

Figure 1:
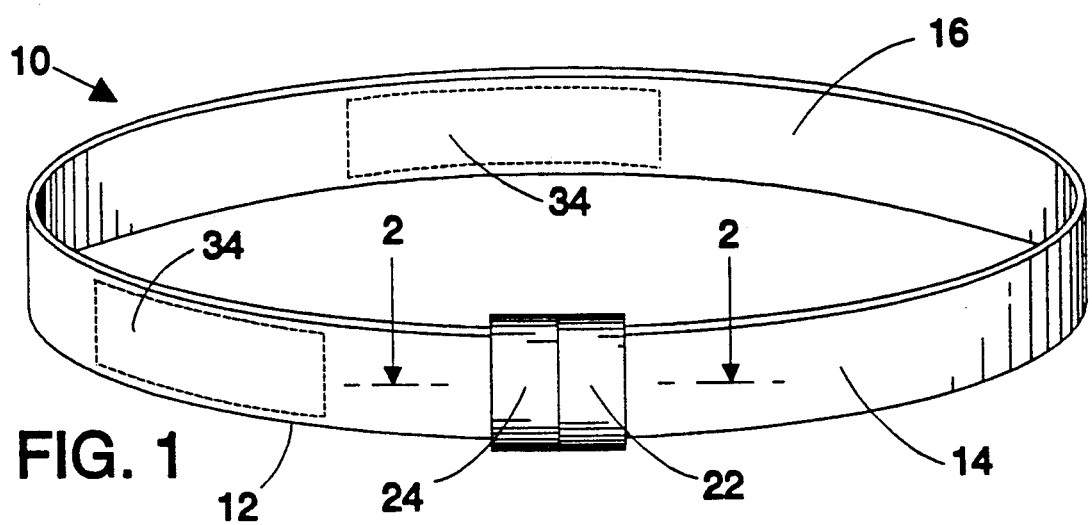
FIG. 1 is a perspective view of an adjustable band shown in the expanded position.

Referring initially to FIG. 1 there is illustrated a perspective view of an adjustable band shown in the fully expanded position in accordance with the present invention, generally designated as 10. The adjustable band 10 consists of a planer strip of flexible plastic magnetized material 12, such as barium ferrite powder in a vinyl mixture extruded in a sheet strip. The material is available in thicknesses between 0.015" and 0.250" with 0.020" being preferred. The thinner material provides the requisite flexibility for achieving smaller diameter bands. The flexible plastic magnetized material is sold by Magnet Sales and Mfg. Co. of Culver City, California 90230; Magnets, Incorporated of Cincinnati, Ohio 45242; and RFJ International Corp. of Cincinnati, Ohio 41296.

Figure 2:
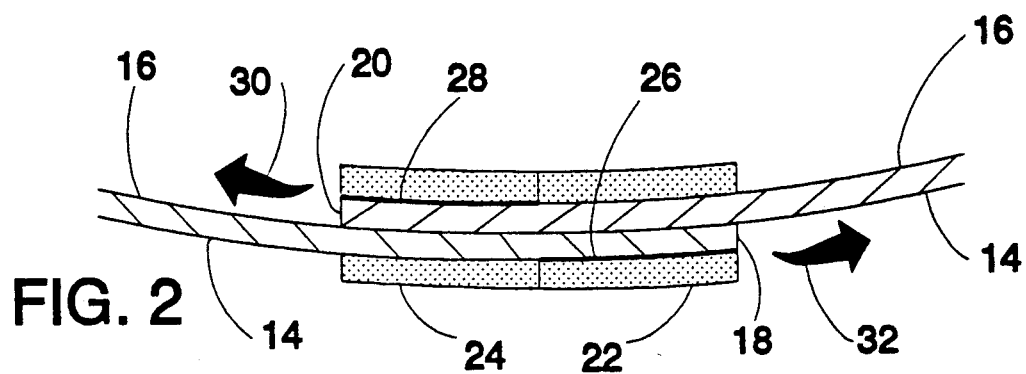
FIG. 2 is an enlarged cross sectional view along the line 2—2 of FIG 1.

The planer strip 12 has a first side 14, a second side 16 opposite to the first side, a first end 18, and a second end 20 opposite to the first end (See FIG. 2). The planer strip 12 is folded onto itself to form a ring shape of a predetermined circumference. A strip ¾" wide by 14" long has been found to be useful for constructing a wristband. After the folding, the first side 14 at the second end 20 is in planer contact with the second side 16 at the first end 18. Since the planer strip 12 is constructed from magnetized material, the two sides 14 and 16 are attracted to each other by the magnetic force of the magnetized material. The magnetic force holds the first side 14 and the second side 16 together in a fixed relative position. A first guide means 22 is coupled to the first side 14 of the planer strip 12 near the first end 18. The second end 20 is passed through it and it slidably holds the second end. The first guide means 22 wraps around both ends 18 and 20 of the planer strip 12 and holds the two sides of the strip 14 and 16 in planer contact, thereby preventing the sides 14 and 16 from physically separating. In the embodiment shown, the guide means 22 consists of a loop of flexible material. A second guide means 24 is coupled to the second end 20 of the planer strip 12. The first end 18 passes through it and it slidably holds the first end. Indicia 34 may be disposed on the first or second side 14, 16 as desired.

FIG. 2 is an enlarged cross sectional view along the line 2—2 of FIG. 1. The first guide means 22 is coupled to the first side 14 of the planer strip 12 near the first end 18. The second end 20 passes through it and it slidably holds the second end. The connection 26 can be fabricated utilizing any mechanical means such as heat lamination or glue to attach the guide means 22 to the first side 14. By exerting a manual force on the guide means 22 in the direction of the arrow 32, the manual force being sufficient to overcome the magnetic attraction of the sides, the first side 14 and the second side 16 may be made to move with respect to one another along the circumference. As the sides 14 and 16 move with respect to one another, the circumference is decreased. When the manual force is removed, the magnetic force between the sides 14 and 16 keeps the adjustable band 10 at the desired circumference which is less than the original circumference.

The second guide means 24 is coupled at 28 to the second side 16 of the planer strip 12 near the second end 20. The first end 18 is passed through it and it slidably holds the first end. By moving the second guide means 24 in the direction of arrow 30, the circumference of the adjustable band 10 is reduced. The two guide means 22 and 24 additionally serve as mechanical stops when they butt against each other as shown in FIGS. 1 and 2 to prevent the ends 18 and 20 of the adjustable band 10 from disengaging.

As shown in FIGS. 1 and 2, the present invention constitutes an adjustable band which permits continuous adjustment over a wide circumferential range. This is contrasted to the prior art which requires expansions or contractions to be made in discrete increments. The present invention is useful in any application where circumferencial adjustment is required, and particularly for items that require identification marking. Potential uses include jewelry such as bracelets, rings, anklets, or collars; apparel such as belts, sashes or hat bands; pet collars; labels for bunched materials such as flower stems, rods, and pencils; and novelty or promotional items.

Figure 3:
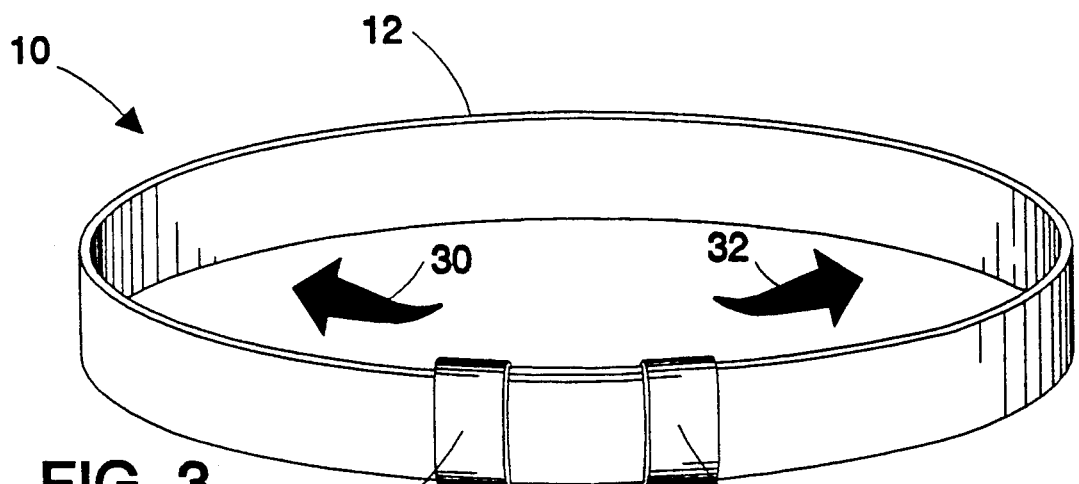
FIG. 3 is a perspective view of the adjustable band with a reduce circumference.
Figure 4:
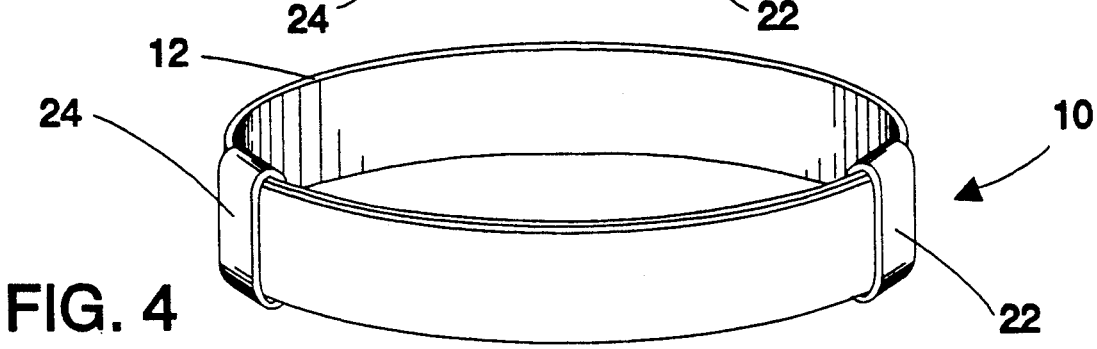
FIG. 4 is a perspective view of the adjustable band with a further circumference.

FIG. 3 is a perspective view of the adjustable band 10 with a reduced circumference. The circumferential position of the guide means 22 and 24 have been manually moved in the directions of the arrows 32 and 30 respectively causing the circumference of the adjustable band 10 to decrease. FIG. 4 is a perspective view of the adjustable band 10 with a further reduced circumference.

FIG. 5 is an enlarged perspective view of the guide means 22. The guide means 22 is fabricated from flexible plastic tubular material. In one embodiment, it is fabricated from magnetized material similar to the magnetized material 12 of the planer strip. In another embodiment, the guide means 22 is fabricated from a magnetic material such as iron.

FIG. 6 is an enlarged perspective view of a second type of guide means, designated as 122. This second type of guide means 122 is fabricated from rigid material which may be magnetic or non-magnetic.

FIG. 7 is an enlarged perspective view of a third type of guide means, designated as 222. This third type of guide means 222 is fabricated from rigid magnetic or non-magnetic material from which a portion has been removed to facilitate connection to the planer strip 12.

FIG. 8 is an enlarged edge view of a portion of an adjustable band similar to FIG. 2. A white or colored layer of flexible non-magnetic material such as vinyl, polyester, polycarbonate, or paper 230 is laminated or glued to the first side 14 for decorative purposes. A similar or different colored material 232 can be laminated or glued to the second side 16. For example, a 0.005" thick layer of white vinyl laminated on both sides of the magnetized material creates a band on which indicia are readily printed while also providing an attractive edge having white on the inside and outside and the darker magnetic material in between.

From the foregoing it should now be recognized that an adjustable band has been disclosed herein. The preferred embodiments of the invention described herein are exemplary and numerous modifications, dimensional variations and rearrangements can be readily envisioned to achieve an equivalent result, all of which are intended to be embraced within the scope of the appended claims.

I claim:

1. An adjustable band, comprising:
  a planar strip of flexible magnetized material having a first side and a second side opposite to said first side and a first end and a second end opposite to said first end;
  said planar strip folded onto itself forming a ring shape having a circumference wherein said first side is in contact with and overlaps said second side resulting in the creation of a magnetic force, said sides being attracted to each other by said magnetic force of said magnetized material;
  a first guide fabricated from a flexible magnetized material coupled to said strip substantially at said first end and said second end passing therethrough with said first side and said second side in planar contact, said first guide allowing said first side and said second side to move with respect to each other along said circumference;
  a second guide fabricated from a flexible magnetized material coupled to said strip substantially at said second end, and slidably holding said first end with said first side and said second side in planar contact, said second guide allowing said first side and said second side to move with respect to each other along said circumference; and
  said first guide and said second guide acting as stops to mechanically prevent said first end and said second end from disengaging;
  whereby, said band maintains a set circumference through the magnetic force of said magnetized material and the circumference of said band may be increased or decreased by changing the positions of said first and second guides.

2. An adjustable band, comprising:
  a planer strip of flexible magnetized material having a first side and a second side opposite to said first side and a first end and a second end opposite to said first end;
  said planer strip folded onto itself forming a ring shape having a circumference wherein said first side is in contact with and overlaps said second side resulting in the creation of a magnetic force, said sides being attracted to each other by said magnetic force of said magnetized material;
  a first guide containing magnetic material coupled to said strip substantially at said first end and said second end passing therethrough with said first side and said second side in planer contact, said first guide allowing said first side and said second side to move with respect to each other along said circumference;
  a second guide containing magnetic material coupled to said strip substantially at said second end, and slidably holding said first end with said first side and said second side in planer contact, said second guide allowing said first side and said second side to move with respect to each other along said circumference; and said first guide and said second guide acting as stops to mechanically prevent said first end and said second end from disengaging;

whereby, said band maintains a set circumference through the magnetic force of said magnetized material and the circumference of said band may be increased or decreased by changing the positions of said first and second guides.

* * * * *